United States Patent
Mayer et al.

(10) Patent No.: US 6,751,956 B2
(45) Date of Patent: Jun. 22, 2004

(54) INTERNAL COMBUSTION ENGINE HAVING AN EXHAUST-GAS TURBOCHARGER AND METHOD FOR OPERATING SUCH AN INTERNAL COMBUSTION ENGINE

(75) Inventors: Christian Michael Mayer, Reutlingen (DE); Andreas Schwarzhaupt, Oberrot (DE); Gernot Spiegelberg, Heimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/338,204

(22) Filed: Jan. 7, 2003

(65) Prior Publication Data

US 2003/0172653 A1 Sep. 18, 2003

(30) Foreign Application Priority Data

Jan. 23, 2002 (DE) ............................. 102 02 322

(51) Int. Cl.⁷ .................... F02D 23/00; F02M 25/07; F02B 33/44; G06F 19/00; G06G 7/70
(52) U.S. Cl. ..................... 60/602; 60/646; 60/657; 123/676
(58) Field of Search ................ 60/600, 602, 646, 60/657; 415/157, 158; 417/407; 123/676

(56) References Cited

U.S. PATENT DOCUMENTS 5,794,445 A * 8/1998 Dungner ................... 60/605.2
6,102,146 A * 8/2000 Schmidt et al. ............... 60/602
6,205,785 B1 * 3/2001 Coleman .................. 60/605.2
6,216,459 B1 * 4/2001 Daudel et al. ................ 60/602
6,467,270 B2 * 10/2002 Mulloy et al. ................ 60/602
6,497,227 B2 * 12/2002 Wang et al. .................. 60/602
2003/0188531 A1 * 10/2003 Wright et al. ................. 60/602

FOREIGN PATENT DOCUMENTS

DE    195 43 190    5/1997
DE    198 57 234    6/2000
DE    199 24 228    12/2000

* cited by examiner

*Primary Examiner*—Sheldon J. Richter
(74) *Attorney, Agent, or Firm*—Kenyon & Kenyon

(57) ABSTRACT

Internal combustion engines, which have an exhaust-gas turbocharger that possesses an adjustable turbine geometry, include a waste-gate bypass. When a valve controlling the waste-gate bypass malfunctions, the pressure in the intake-system branch and the exhaust-system branch may increase to an undesirably high level, which may result in component parts being damaged. To prevent this in an internal combustion engine having an exhaust-gas turbocharger, a pressure sensor is provided, which determines the pressure in or upstream from the turbine and transmits it to an electronic control unit. When the control unit determines that a preselected limiting value of the pressure has been exceeded, the turbine geometry is modified so that the turbine may be prevented from being damaged. This arrangement is provided for internal combustion engines, which have an exhaust-gas turbocharger and are equipped with, in particular, an engine-braking device.

17 Claims, 1 Drawing Sheet

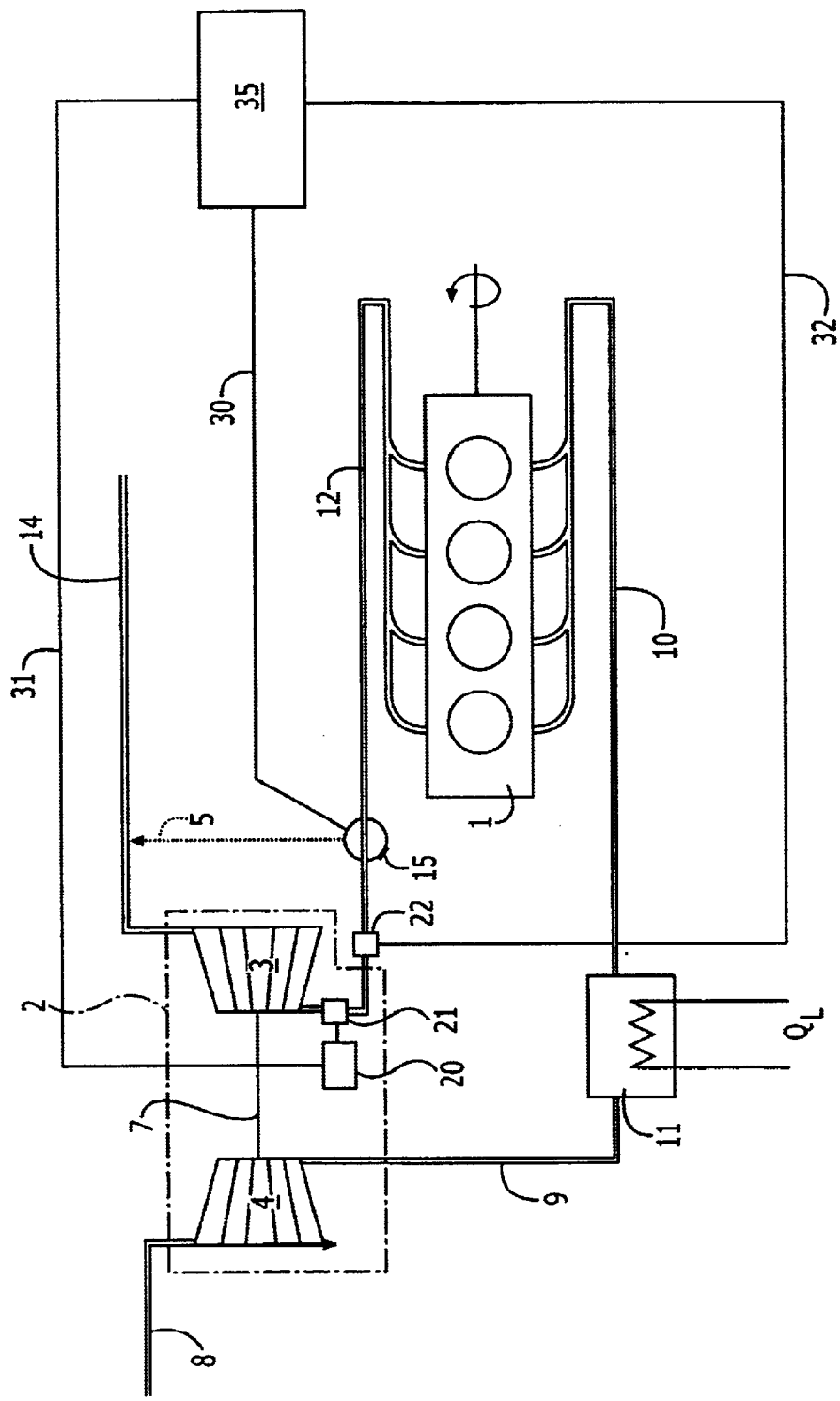

INTERNAL COMBUSTION ENGINE HAVING AN EXHAUST-GAS TURBOCHARGER AND METHOD FOR OPERATING SUCH AN INTERNAL COMBUSTION ENGINE

CROSS-REFERENCE TO RELATED APPLICATIONS

The present application claims priority to Application No. 102 02 322.0, filed in the Federal Republic of Germany on Jan. 23, 2002, which is expressly incorporated herein in its entirety by reference thereto.

FIELD OF THE INVENTION

The present invention relates to an internal combustion engine having an exhaust-gas turbocharger and to a method for operating such an internal combustion engine.

BACKGROUND INFORMATION

Exhaust-gas turbochargers having a variable geometry, a so-called VTG (variable turbine geometry), are described in German Published Patent Application No. 198 57 234 for obtaining an adjusted or adapted pressure build-up of the compressor of the exhaust-gas turbocharger, using a turbine geometry adjusted to the operating point of the internal combustion engine. Such exhaust-gas turbochargers are also used for trucks provided with an engine braking device. During engine braking or a trailing-throttle state, compressed air is supplied to the internal combustion engine by the compressor of the exhaust-gas turbocharger. The precompressed air is compressed again in the cylinder and subsequently discharged through a separate valve at the cylinder head, into the exhaust-system branch, and then travels further to the turbine of the exhaust-gas turbocharger. Since no combustion process takes place in the combustion chambers during engine braking, increased engine-braking action is achieved by a boosted charge.

In this context, the pressures occurring during engine braking can be high enough to damage the turbine of the exhaust-gas turbocharger. In order to rule this out, a bypass, which bypasses the turbine of the exhaust-gas turbocharger when a valve accommodated in the bypass, a so-called waste-gate valve, is in the open position, is provided in the exhaust-system branch. The waste gate valve may be electrically controlled by an electronic control unit. But if the waste gate valve in the bypass malfunctions, e.g., by mechanically jamming, then the pressure increase at the turbine occurring during engine braking can no longer be reduced by releasing gas. As a result, the compressor driven by the turbine continues to generate intense pressure in the intake-system branch. In this context, the pressure can assume values that are greater than the maximum values of the components in the intake-system branch, which causes damage to the component parts. In particular, the pressure increase in the intake-system branch of the internal combustion engine can become so large, that the maximum pressure, for example 2 bar, of an intercooler usually installed downstream from the compressor of the exhaust-gas turbocharger is exceeded, so that the intercooler is damaged. In addition, the turbine can be damaged by the high flow velocities. In particular, vibrations can occur which destroy the turbine blades upon reaching the resonant frequency.

SUMMARY

The internal combustion engine of the present invention, which has an exhaust-gas turbocharger, and the method of the present invention for operating such an internal combustion engine, may provide a safety system, which allows a safeguarded engine-braking state, in which an undesirably high pressure increase in the intake-system branch and the exhaust-system branch may not occur, even in response to a malfunction of a valve provided in the bypass.

This safety function may be provided without a large amount of expenditure, since the electric adjustment of or an electric adjustment system for the turbine geometry, in particular the guide-blade adjustment or a guide-blade adjusting system, which is usually already present, may be used. In this context, this safety function may easily be implemented as an additional software module in the control unit already present.

The measures described below may provide further refinements and improvements of the internal combustion engine having an exhaust-gas turbocharger, and of a method for operating such an internal combustion engine.

The FIGURE schematically illustrates an exemplary embodiment of the present invention is represented in the drawing in simplified form and explained in detail in the following description.

BRIEF DESCRIPTION OF THE DRAWING

The FIGURE is a schematic view of an example embodiment of an internal combustion engine having an exhaust-gas turbocharger according to the present invention.

DETAILED DESCRIPTION

Illustrated in the FIGURE in a schematically simplified manner is an internal combustion engine 1 having an exhaust-gas turbocharger 2, which has a dotted and dashed line as a border, and whose compressor 4 directs air through an intake line 8 into an intake pipe 9 of internal combustion engine 1. A supercharger shaft 7 connects compressor 4 in a rotatably fixed manner to a turbine 3, which drives compressor 4. During the operation of engine 1, turbine 3 is acted upon by the exhaust-gas stream from the cylinders of engine 1. The exhaust gas is directed by the engine through an exhaust-gas line 12 into turbine 3. The exhaust gas exits turbine 3 through an outlet 14 and, for example, is directed onward into a catalytic converter. The air compressed by compressor 4 flows from first intake pipe 9 to an intercooler 11, where it is cooled and flows into a second intake pipe 10 and on to the individual cylinders of internal combustion engine 1.

Exhaust pipe 12 of engine 1 has a so-called waste-gate bypass 5, through which the exhaust-gas stream may bypass turbine 3 and be conveyed directly to outlet line 14. If a valve 15, which is accommodated in bypass 5, is electromagnetically operable, and controls waste-gate bypass 5, is opened, then the pressure of the exhaust gas on turbine 3 decreases. This causes the power output of compressor 4 to correspondingly decrease as well, so that a desired pressure drop occurs in intake-system branch 9, 10. Such valves 15 are referred to as waste-gate valves and may be controlled by an electronic control unit 35 via a control line 30.

Turbine 3 has an adjustable geometry, which is schematically indicated in the drawing by an adjusting element 21. Adjusting element 21 may be controlled by an actuator 20. Actuator 20 is connected to electronic control unit 35 by a control line 31. Actuator 20 is controlled by pulses of control unit 35, which results in adjusting element 21 of turbine 3 being adjusted. All arrangements of an adjustable turbine geometry may be considered for implementing the present invention. Adjusting element 21 may be an infinitely adjustable, electronic guide-blade adjustment system or adjuster or guide-grating or guide-grill adjustment system or adjuster, as is described, for example, in German Published Patent Application No. 195 43 190. Slide-valve solutions are also possible, where the flow of exhaust gas of, e.g., a twin-scroll turbine housing, is controlled by an axially movable slide valve. The slide valve is arranged to be electromagnetically movable and may be controlled by an electronic control unit, as well. Such solutions are sufficiently conventional by the technical world under the term of slide-valve VTG. To this end, reference is made to German Published Patent Application No. 199 24 228 as an example for implementing a slide-valve solution. The slide valve, which represents adjusting element 21, may also be actuated, for example, by an electric drive unit, e.g., a servomotor, which then represents actuator 20.

The present invention provides for a pressure sensor 22 being installed in turbine 3 or inside its housing or upstream from turbine 3 in exhaust pipe 12. Pressure sensor 22 determines the pressure upstream from adjusting element 21 or the pressure in exhaust pipe 12. Electric line 32 connects pressure sensor 22 to control unit 35, which evaluates signals of pressure sensor 22. In the event of a predetermined, maximum pressure value of approximately 2 bar being exceeded in turbine 3 or exhaust pipe 12, which may occur in response to a malfunction of waste-gate valve 15, e.g., due to mechanical jamming, this is detected by control unit 35. Control unit 35 consequently controls actuator 20 so that adjusting element 21 of turbine 3 moves into a position that does not damage the blades of the turbine wheel. This position may be an open position, in which a decreased flow rate flows through the turbine wheel. When the guide blades of a blade ring are adjustable, the guide blades are brought into an open position, so that the distance between the individual guide blades is maximized. In the slide-valve solution, the slide valve is pulled out of the exhaust branches of the turbine, so that the flow from the exhaust branches decelerates and reaches the turbine wheel without restriction.

This safety function may be provided without a large amount of expenditure, since the electric adjustment or adjuster of the turbine geometry, in particular the guide-blade adjustment or adjuster, which may already be present, may be used. In this context, this safety function may easily be implemented in control unit 35 as a further software module.

What is claimed is:

1. An internal combustion engine, comprising:
   an exhaust-gas turbocharger including a compressor and a turbine having variable geometry;
   an electronic control unit;
   a bypass arranged to bypass the turbine;
   a valve configured to control a flow rate in the bypass; and
   a pressure sensor configured to determine a pressure one of in and upstream from the turbine and to transmit a signal representing the pressure to the electronic control unit, the electronic control unit configured to control the turbine geometry to prevent damage to the turbine in response to a predetermined limiting value of the pressure being exceeded.

2. The internal combustion engine according to claim 1, wherein the valve includes a waste gate.

3. The internal combustion engine according to claim 1, wherein the pressure sensor is arranged in an exhaust pipe between the turbine and the engine.

4. The internal combustion engine according to claim 1, wherein the predetermined limiting value of the pressure is about 2 bar.

5. The internal combustion engine according to claim 1, wherein the control unit is configured to control an actuator adapted to actuate an adjusting element to modify the turbine geometry.

6. The internal combustion engine according to claim 5, wherein the adjusting element includes a guide-blade adjusting system.

7. The internal combustion engine according to claim 5, wherein the adjusting element includes a guide-blade adjuster.

8. An internal combustion engine comprising:
   an exhaust-gas turbocharger including a compressor and a turbine having variable geometry;
   an electronic control unit;
   a bypass arranged to bypass the turbine;
   a valve configured to control a flow rate in the bypass; and
   a pressure sensor configured to determine a pressure one of in and upstream from the turbine and to transmit a signal representing the pressure to the electronic control unit, the electronic control unit configured to control the turbine geometry to prevent damage to the turbine in response to a predetermined limiting value of the pressure being exceeded;
   wherein the pressure sensor is arranged inside a turbine housing upstream from a turbine wheel of the turbine.

9. An internal combustion engine comprising:
   an exhaust-gas turbocharger including a compressor and a turbine having variable geometry;
   an electronic control unit;
   a bypass arranged to bypass the turbine;
   a valve configured to control a flow rate in the bypass; and
   a pressure sensor configured to determine a pressure one of in and upstream from the turbine and to transmit a signal representing the pressure to the electronic control unit, the electronic control unit configured to control the turbine geometry to prevent damage to the turbine in response to a predetermined limiting value of the pressure being exceeded;
   wherein the control unit is configured to control an actuator adapted to actuate an adjusting element to modify the turbine geometry; and
   wherein the adjusting element includes a slide valve configured to control exhaust-gas flow in front of a turbine wheel of a multiscroll turbine.

10. A method for operating an internal combustion engine having an exhaust-gas turbocharger, which includes a compressor and a turbine having variable geometry, the engine including a bypass configured to bypass the turbine and a valve configured to control a flow rate in the bypass, comprising:
    determining a pressure one of in and upstream from the turbine by a pressure sensor;
    supplying a signal relating to the determined pressure to an electronic control unit by the pressure sensor;
    controlling the turbine geometry by the electronic control unit in response to a predetermined limiting value of the pressure being exceeded to prevent damage to the turbine;
    wherein the determining step includes the substep of determining pressure inside a turbine housing upstream from a turbine wheel of the turbine housing by the pressure sensor.

11. A method for operating an internal combustion engine having an exhaust-gas turbocharger, which includes a compressor and a turbine having variable geometry, the engine including a bypass configured to bypass the turbine and a valve configured to control a flow rate in the bypass, comprising:
    determining a pressure one of in and upstream from the turbine by a pressure sensor;
    supplying a signal relating to the determined pressure to an electronic control unit by the pressure sensor;

controlling the turbine geometry by the electronic control unit in response to a predetermined limiting value of the pressure being exceeded to prevent damage to the turbine;

controlling by the control unit an actuator to actuate an adjusting element to modify the turbine geometry;

wherein the adjusting element includes a slide valve configured to control exhaust-gas flow in front of a turbine wheel of a multiscroll turbine.

12. A method for operating an internal combustion engine having an exhaust-gas turbocharger, which includes a compressor and a turbine having variable geometry, the engine including a bypass configured to bypass the turbine and a valve configured to control a flow rate in the bypass, comprising:

determining a pressure one of in and upstream from the turbine by a pressure sensor;

supplying a signal relating to the determined pressure to an electronic control unit by the pressure sensor;

controlling the turbine geometry by the electronic control unit in response to a predetermined limiting value of the pressure being exceeded to prevent damage to the turbine.

13. The method according to claim, 12, wherein the determining step includes the substep of determining pressure in an exhaust pipe between the turbine and the engine by the pressure sensor.

14. The method according to claim 12, wherein the predetermined limiting value of the pressure is about 2 bar.

15. The method according to claim, 12, further comprising controlling by the control unit an actuator to actuate an adjusting element to modify the turbine geometry.

16. The method according to claim 15, wherein the adjusting element includes a guide-blade adjusting system.

17. The method according to claim 15, wherein the adjusting element includes a guide-blade adjuster.

* * * * *